Patented Aug. 14, 1945

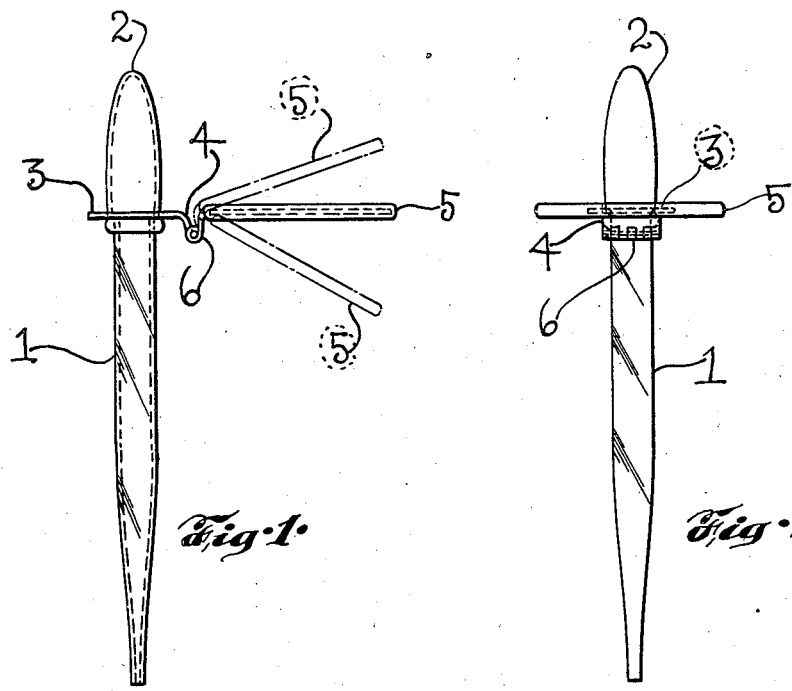
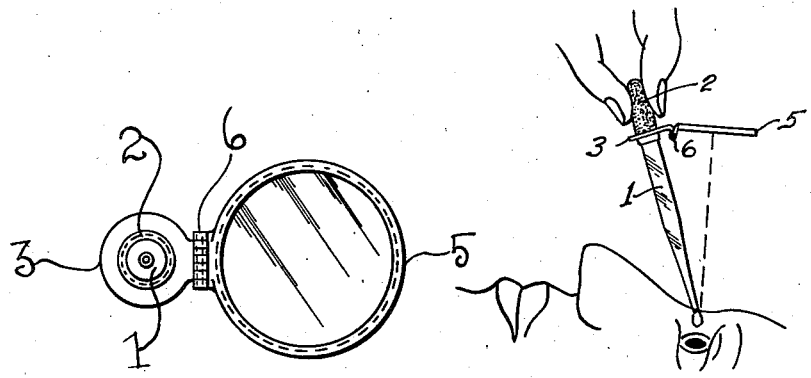

2,382,771

UNITED STATES PATENT OFFICE 2,382,771

MEDICINE DROPPER

Louis E. Bowers, Phoenix, Ariz.

Application March 17, 1944, Serial No. 526,885

2 Claims. (Cl. 128—233)

This invention relates to medicine droppers and the like, and particularly to a device of this kind equipped with a reflector to enable the user to place a drop of medicine at exactly the desired place, for instance, in the eye, or near it.

Nearly every one has experienced the difficulty of dropping medicine into the eye while looking into an ordinary mirror. Very often several drops are deposited near the eye and roll down the face before a drop falls into the eye, thus not only wasting the medicine, but causing the inconvenience of soiling the face and often dropping medicine onto the clothing and staining it. My device is designed to overcome these difficulties and inconveniences by assisting the user to drop the medicine accurately at the exact point where he wishes to deposit it. The danger of accidentally pushing the dropper into the eye is also overcome through the use of my device.

My idea can also be used in connection with eyebrow tweezers, or any other small instrument which is used close to the eyes, when it is difficult to see the point that is being operated on by the help of an ordinary mirror, but for the purpose of this application I have illustrated and will describe the device as a combined eyedropper and mirror. Due to its simplicity of construction, my device can be quickly and cheaply produced.

Fig. 1 is an elevational view of my invention illustrating different ways in which the mirror may be adjusted.

Fig. 2 is a side elevation of the device with the mirror adjusted at a right angle to the dropper.

Fig. 3 is a bottom plan view of the device with the mirror adjusted at a right angle to the dropper.

Fig. 4 is a view showing the manner in which the dropper is used.

My invention comprises a medicine dropper 1 equipped with the usual rubber bulb 2. Near the base of the bulb 2 where it is slipped over an end of the dropper 1 a collar 3, preferably formed of metal or plastic material, encircles the bulb 2, said collar having a downwardly bent portion 4 at one side. A mirror 5 is hingedly attached at 6 to the downwardly bent portion 4 of the collar 3, so that said mirror 5 is adjustable with relation to the dropper 1 (Fig. 1). At its free end the dropper is usually, though not necessarily, tapered.

In operation, suppose the dropper is to be used to deposit medicine into an eye of the user. After drawing a sufficient quantity of medicine into the dropper by the usual method of squeezing the bulb 2, he tips his head backward and then holds the device near his face in such a position that he can see the eye in the mirror 5. Looking into the mirror, he then adjusts the same to give him the best possible view of the point at which he wishes to deposit the medicine, that is, either the inner corner, the outer corner, or possibly the center of the eye, and then, still looking into the mirror, he is enabled to hold the free, open end of the dropper exactly above this point, so that when he gently squeezes the bulb 2 a drop of medicine will fall directly into the eye at exactly the desired spot, with no danger of injuring the eye by accidentally pushing the dropper into it, or of letting the medicine fall beside the eye and onto the face.

When the operation has been completed and the dropper emptied, the mirror may be folded downwardly on the hinge 6 until it rests against the side of the dropper, in which position it will take up little space and may be easily carried about in the user's pocket.

If desired, the mirror 5 may be of magnifying glass, though this is not essential to perfect performance of the device. It will be understood that this idea may be applied to other devices for operating upon the face, as mentioned above, without departing from the spirit of the invention.

I claim:

1. A device for depositing medicine in the user's eye, comprising a medicine dropper having a bulb at one end, a member encircling said bulb, a reflector, and means connecting said reflector and said encircling member to permit adjustment of said reflector to the position which best enables the user to see the point at which medicine is to be dropped.

2. A device for depositing medicine in the user's eye, comprising a medicine dropper having a bulb at one end, a member encircling said bulb and having a downturned portion, a reflector, and a hinge connecting said downturned portion of said encircling member and said reflector to permit adjustment of said reflector to the position which best enables the user to see the point at which medicine is to be dropped.

LOUIS E. BOWERS.